(12) United States Patent
Mainiero

(10) Patent No.: US 9,260,993 B1
(45) Date of Patent: Feb. 16, 2016

(54) OIL AND AIR SEPARATOR SYSTEM AND METHOD

(71) Applicant: UPR Products, Inc., Lake Worth, FL (US)

(72) Inventor: Joseph Mainiero, Lake Worth, FL (US)

( * ) Notice: Subject to any disclaimer, the term of this patent is extended or adjusted under 35 U.S.C. 154(b) by 0 days.

(21) Appl. No.: 14/806,035

(22) Filed: Jul. 22, 2015

(51) Int. Cl.
*F01M 13/04* (2006.01)
*B01D 45/08* (2006.01)
*B01D 45/06* (2006.01)

(52) U.S. Cl.
CPC .............. *F01M 13/04* (2013.01); *B01D 45/06* (2013.01); *B01D 45/08* (2013.01); *F01M 2013/0433* (2013.01); *F01M 2013/0461* (2013.01); *Y10S 55/19* (2013.01)

(58) Field of Classification Search
CPC .................. B01F 3/04262; B01F 2003/04319; B01F 2003/04361; C02F 1/72; B01D 46/0021; B01D 29/018; B01D 46/003; B01D 45/06; B01D 45/08; F01M 13/04; Y10S 55/19; F02M 13/00; F02M 13/04; F02M 2013/0433; F02M 2013/0461
USPC ........ 55/385.3, 462, 423, 337, 465, 442, 444, 55/445, 446, 418, 419, DIG. 19; 123/198 E, 123/572, 573; 210/137, 232, 758, 184; 95/267, 272
See application file for complete search history.

(56) References Cited

U.S. PATENT DOCUMENTS

| | | | | | |
|---|---|---|---|---|---|
| 1,306,421 | A | * | 6/1919 | Feltz | B01D 45/08 123/198 R |
| 1,871,546 | A | * | 8/1932 | McClafferty | F25B 43/02 55/446 |
| 1,915,521 | A | * | 6/1933 | Edwards | F01M 13/04 55/446 |
| 2,731,958 | A | * | 1/1956 | Robley | F01M 13/04 123/573 |
| 3,524,437 | A | * | 8/1970 | Crandall | F01M 13/04 123/41.2 |
| 3,779,221 | A | * | 12/1973 | Gartner | F01M 13/04 123/573 |
| 4,061,082 | A | * | 12/1977 | Shuler | F24F 13/068 454/298 |
| 4,627,406 | A | * | 12/1986 | Namiki | F01M 13/04 123/572 |
| 5,484,575 | A | * | 1/1996 | Steenackers | B01D 53/9454 422/169 |
| 5,586,996 | A | * | 12/1996 | Manookian, Jr. | B01D 46/0021 123/573 |
| 5,914,035 | A | * | 6/1999 | Bradford | B01D 17/00 210/232 |
| 6,058,917 | A | * | 5/2000 | Knowles | F01M 13/04 123/573 |
| 6,585,805 | B1 | * | 7/2003 | Wheat | B01D 53/06 55/502 |

(Continued)

*Primary Examiner* — Duane Smith
*Assistant Examiner* — Minh-Chau Pham
(74) *Attorney, Agent, or Firm* — Uradnik Law Firm

(57) ABSTRACT

An oil and air separation can includes: a diffuser tube positioned within a diffuser shield at a can intake for blow-by gases; and a first diffuser screen spaced vertically apart from a second diffuser screen proximate a can exhaust for blow-by gases, wherein the first diffuser screen and the second diffuser screen are spaced horizontally from the diffuser tube and extend about the diffuser shield.

19 Claims, 4 Drawing Sheets

(56) References Cited

U.S. PATENT DOCUMENTS

| | | | | |
|---|---|---|---|---|
| 7,112,236 B2 * | 9/2006 | Hoverson | B03C 3/025 55/DIG. 19 |
| 7,517,392 B2 * | 4/2009 | Neff | F16K 17/19 137/176 |
| 7,604,676 B2 * | 10/2009 | Braziunas | B01D 45/06 123/198 E |
| 7,938,875 B2 * | 5/2011 | Son | F01M 13/00 123/198 E |
| 2002/0088212 A1 * | 7/2002 | Ernst | B01D 45/02 55/385.3 |
| 2002/0189213 A1 * | 12/2002 | Neuschwander | B01D 45/08 55/385.3 |
| 2003/0010694 A1 * | 1/2003 | Holt | B01D 29/018 210/184 |
| 2004/0065200 A1 * | 4/2004 | Lo | B01D 45/16 95/269 |
| 2004/0069286 A1 * | 4/2004 | Knowles | F01M 13/022 123/572 |
| 2005/0247035 A1 * | 11/2005 | Noga | B01D 45/08 55/462 |
| 2007/0240391 A1 * | 10/2007 | Becker | B01D 46/0031 55/423 |
| 2010/0300297 A1 * | 12/2010 | Ng | B01D 45/08 96/221 |
| 2012/0151887 A1 * | 6/2012 | Dorao | B01D 45/14 55/437 |
| 2012/0267294 A1 * | 10/2012 | Herman | B01D 29/232 210/137 |
| 2013/0205726 A1 * | 8/2013 | Wada | B01D 46/003 55/337 |
| 2014/0109533 A1 * | 4/2014 | Horiuchi | F01M 13/04 55/430 |
| 2015/0041412 A1 * | 2/2015 | Cortes | B01F 3/04241 210/758 |

* cited by examiner

OIL AND AIR SEPARATOR SYSTEM AND METHOD

FIELD OF THE DISCLOSURE

The invention relates generally to engine positive crankcase ventilation (PCV) systems and methods for recycling blow-by gases through a PCV valve into the engine's intake manifold, and more particularly in one exemplary embodiment, to systems and methods including an oil and air separator system for removal of crankcase oil from such blow-by gases.

BACKGROUND

In a combustion engine, blow-by gases typically include unburned gasoline. That is, an amount of air and unburned gasoline from the engine cylinder is pulled past the piston rings and into the crankcase. Instead of exhausting such blow-by gases to the atmosphere, a positive crankcase ventilation (PCV) system recycles the blow-by gases through a PCV valve into the engine's intake manifold. Such recycling occurs when the engine is operating at relatively slow speeds (e.g. idling), i.e., when the air pressure in the crankcase is higher than the air pressure in the intake manifold.

One problem associated with PCV systems and their use involves oil vapors. An engine's crankcase is used to store oil. A pan located below the crankshaft holds oil, and generally oil vapors from the oil in the pan may find their way into the blow-by gases.

It is undesirable for oil to be recycled with blow-by gases into an engine's intake manifold. Such oil may degrade engine performance by lowering the overall octane of the combustion mixture in a cylinder. Such oil also may coat the air intake and prevent airflow.

To combat the presence of oil in blow-by gases, oil and air separators were developed to remove the oil from the blow-by gases before recirculation into the intake manifold. There are various different models or types of oil and air separators available, one of which is shown by way of example in FIG. 1. FIG. 1 describes one popular type of oil and air separators that involves passing oily blow-by gases through a filter material. The oil collects in droplets on the filter material, which is held in place by a screen. The oil is allowed to drop into the bottom of a can where the oil collects for later removal.

This "can approach" to oil and air separation, as shown by way of example in FIG. 1, is not without its drawbacks, however. In particular, the screen in the can that helps hold the filter material in place may serve as a pathway along which oil may flow. See FIG. 1. Thus, unwanted oil vapors may become present in the exhaust from the oil and air separator can.

SUMMARY

The present disclosure provides oil and air separation systems and methods. In one exemplary embodiment, an oil and air separation can includes: (i) a diffuser tube positioned within a diffuser shield at a can intake for blow-by gases; and (ii) a first diffuser screen spaced vertically apart from a second diffuser screen proximate a can exhaust for blow-by gases, wherein the first diffuser screen and the second diffuser screen are spaced horizontally from the diffuser tube and extend about the diffuser shield.

Other benefits and advantages of the present disclosure will be appreciated from the following detailed description.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to oil and air separation and can use; etc. Such aspects related to this disclosure do not depart from the invention, and it is therefore intended that the invention not be limited by the certain aspects set forth of the events and circumstances related to this disclosure.

Figure 1:
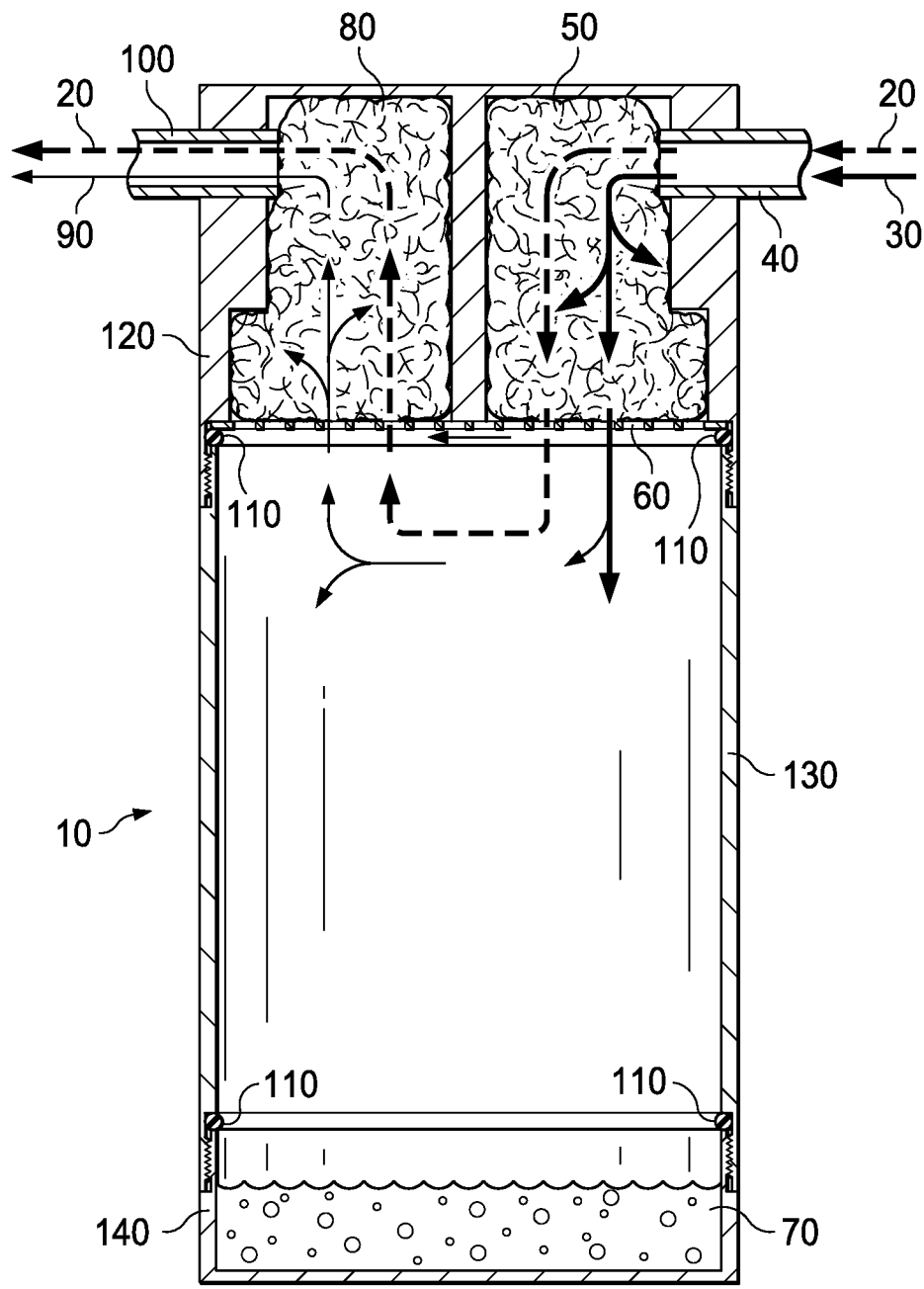
FIG. 1 is a cross sectional view of a prior art oil and air separation can.

Turning now to the drawings, FIG. 1 shows an exemplary prior art oil and air separation can 10. Blow-by gas 20 enters the can 10 along with oil vapors 30 at intake port 40. The gases 20 and 30 together are channeled through intake filter material 50. Intake filter material 50 may consist of a stainless steel mesh. Oil from the oily vapors collects on the intake filter material 50, and flows downward to screen 60, e.g., due to gravity. Screen 60 holds the intake filter material 50 in place proximate the intake port 40. Screen 60 also holds exhaust filter material 80 in place proximate the exhaust port 100. One or more rubber o-rings 110 may be used to seal the various portions of the can 10 (i.e., the upper section 120, the middle section 130, and the lower section 140, each removably joined to one or more other sections by threaded engagement).

Oil collects on the screen 60 and drips to form an oil pool 70 in the bottom of the can 10. Oil also may migrate across the surface of the screen 60 and into the exhaust filter material 80, as shown in FIG. 1. From there, blow-by gases 20, as well as oily vapors 90 resulting at least in part from the oil migration across the surface of screen 60, may exit the can 10 at exhaust port 100.

Figure 2:
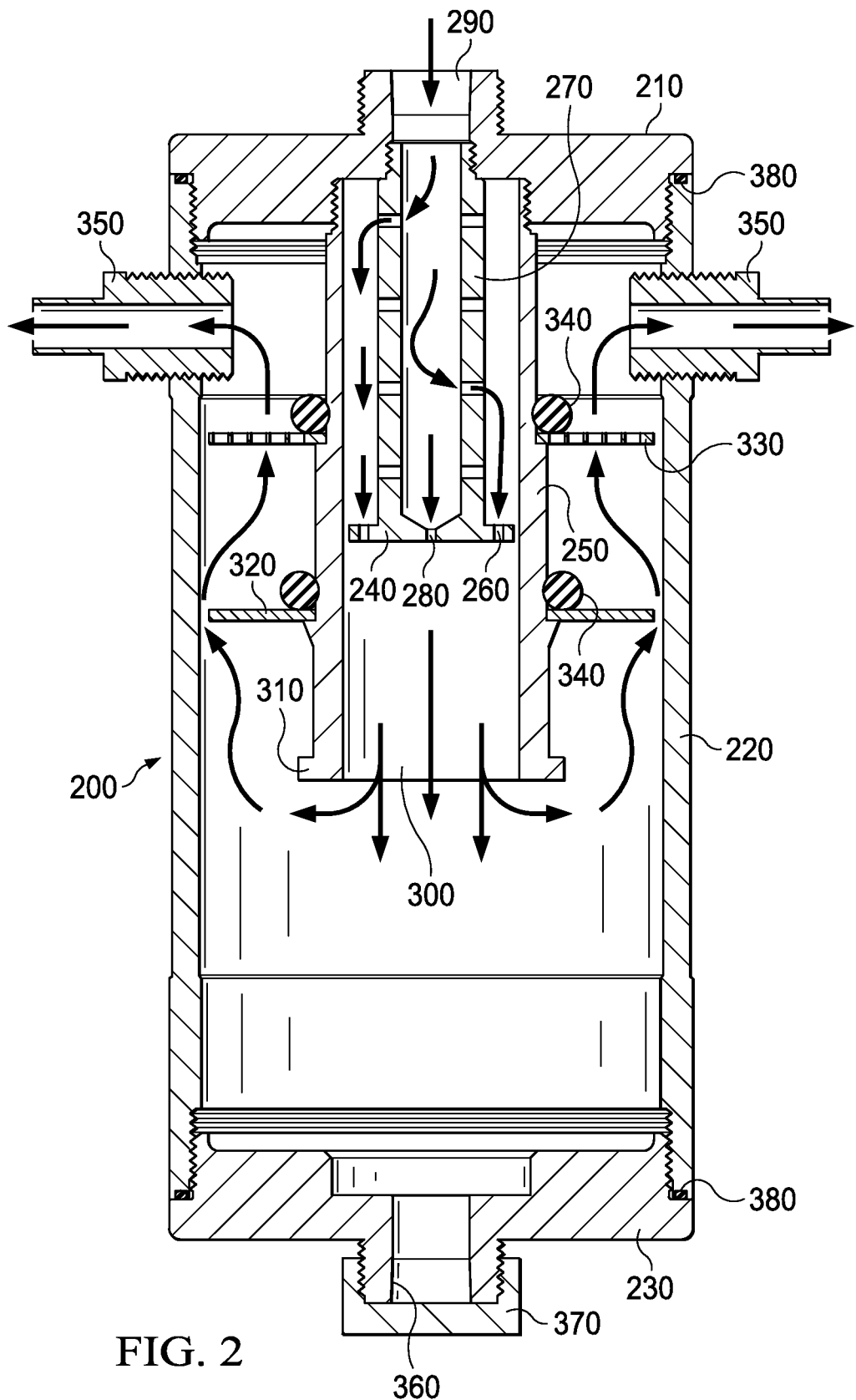
FIG. 2 is an exemplary embodiment of an oil and air separation can including, in one aspect, a diffuser tube positioned within a diffuser shield and a pair of diffuser screens spaced vertically apart from one another, the diffuser screens circumventing the outside of the diffuser shield.

The oil and air separation can embodiment shown in FIG. 2 addresses the problems associated with the prior art embodiment of FIG. 1, by helping to reduce or eliminate the flow of oil outward through the can exhaust ports. As shown in FIG. 2, a can 200 includes a top portion 210, a middle portion 220, and a bottom portion 230. The middle portion 220 at its upper end is removably coupled by threaded engagement to the lower end of top portion 210. The middle portion 220 at its lower end is removably coupled by threaded engagement to the upper end of bottom portion 230.

The top portion 210 at its lower end is also removably coupled by threaded engagement to a diffuser tube 240. The diffuser tube 240 is positioned within a diffuser shield 250 that is removably coupled by threaded engagement to the top portion 210. The diffuser shield 250 generally separates the volume defined by the can 200 into a first intake side and a second exhaust side. The diffuser tube 240 is disposed within the first intake side.

The diffuser tube 240 may be a hollow tubular, cylindrically shaped unit and include a flange 260 about its lower end that proximately corresponds to the inside diameter of the diffuser shield 250. The sidewall 270 and bottom 280 (including without limitation the flange 260) of the diffuser tube 240 may include a plurality of ports through which intake gases may flow to travel from the can intake port 290 to the lower end 300 of diffuser shield 250. See FIG. 2.

The diffuser shield 250 may be a hollow tubular, cylindrically shaped unit and include a flange 310 about its lower end 300. The diameter of the flange 310 is less than the inside diameter of the can portion 220. Thus, the diffuser shield 250 in part may define between the shield 250 and the can portion 220 a generally annular space that comprises the second exhaust side.

Spaced vertically about the diffuser shield 250 within the second exhaust side may be a pair of diffuser screens 320, 330. As shown in FIG. 2, the diffuser screens may extend from the diffuser shield 250 to points proximate the inside wall of the can portion 220. Each diffuser screen 320, 330 may be removably held in place by an o-ring 340. More than two vertically spaced diffuser screens may be used depending upon the circumstances involved in a particular application. As shown in FIG. 2, the diffuser screen 320 is a solid screen, which means that vapors may pass vertically across the screen 320 by traveling in the space between the screen 320 and the interior sidewall of can portion 220. The diffuser screen 330, on the other hand, includes a plurality of holes through which vapors also may pass. Of course, the choice of using a solid screen, a perforated screen, or some other screen configuration will depend upon the circumstances involved in a particular application.

Figure 3:
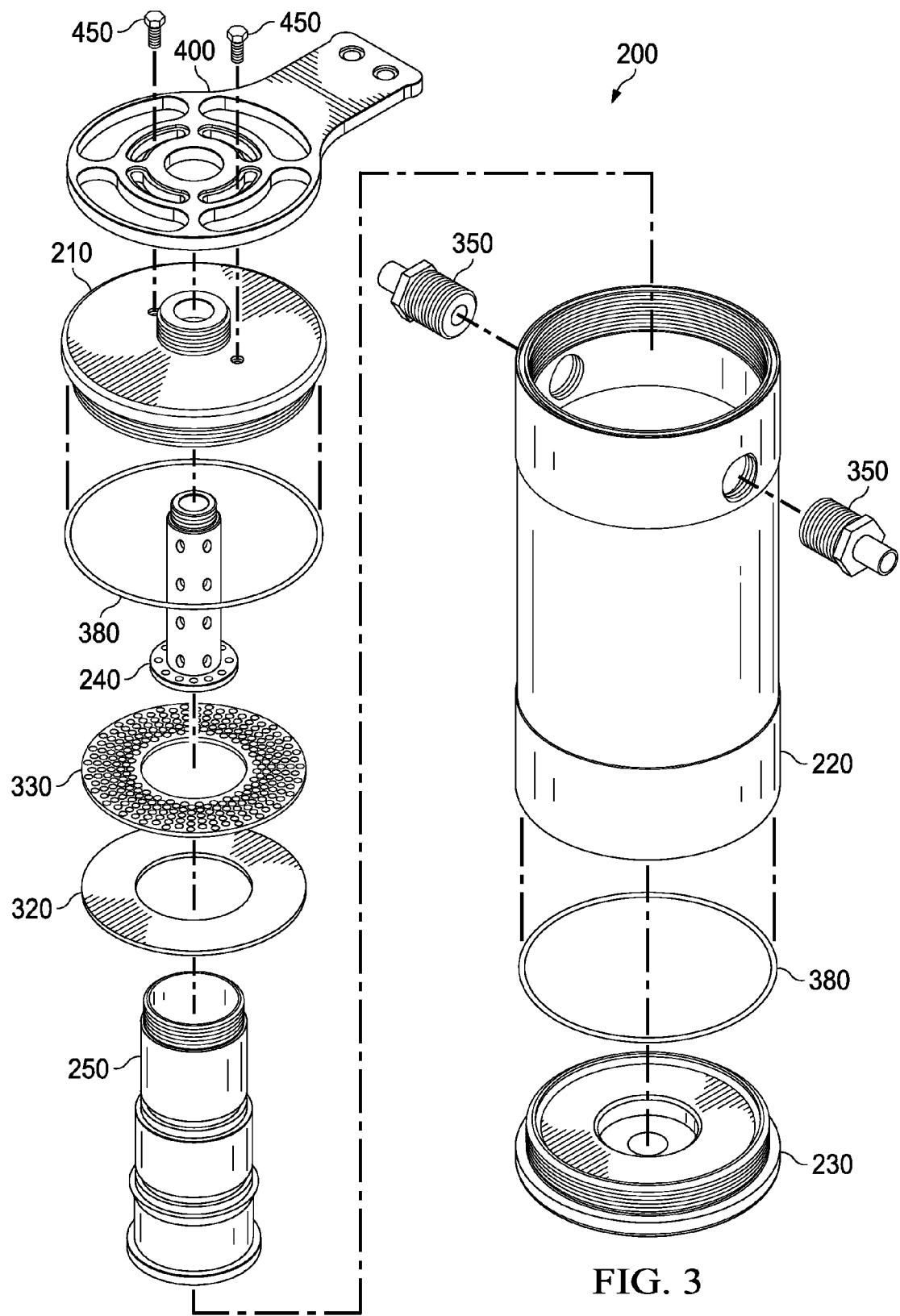
FIG. 3 is an exploded view of the exemplary embodiment of an oil and air separation can shown in FIG. 2.

The vertically spaced diffuser screens 320, 330 may be positioned beneath one or more exit ports 350 from which vapors may exit the can 200. As shown in FIGS. 2 and 3, the exit ports may comprise one or more nipples that are removably threadingly engaged at the upper end of can portion 220. In another embodiment, the exit ports may be disposed in the top portion 210 of can 200 at the second exhaust side.

The operation of the can 200 involves blow-by gases and oily vapors entering the can 200 at intake port 290. From there, the flow is directed through the interior of diffuser tube 270 to the lower end 300 of diffuser shield 250. Oil collects on diffuser tube 240 and on diffuser shield 250 and flows to (e.g., due to gravity) and collects in a reservoir in part formed by the bottom portion 230 of can 200. The bottom portion 230 of can 200 may be adapted with a drain 360 fluidly coupled to the reservoir and a cap 370 removably threadingly engaged thereto. The flange 310 of diffuser shield 250 prevents oil from seeping upward along the outer wall of the diffuser shield 250. Blow-by gases then travel upwards through the second exhaust side, past the diffuser screens 320, 330, and out exit ports 350.

Spaces within the can 200 may in certain embodiments be filled in whole or in part with stainless steel mesh or other filter material to help promote the removal of oil from the blow-by gases traveling through can 200. In particular, removably placing stainless steel mesh in the annular space between the diffuser tube 240 and diffuser shield 250 may assist in removing oil from blow-by gases. Oil collects on the filter material and flows downward (e.g., due to gravity) to the reservoir formed in part by bottom portion 230.

In one embodiment, the can 200 is constructed to be wholly modular in form. That is, the can may be completely disassembled (e.g., for cleaning) and then reassembled for use due to the absence of rigid fixed attachments between the various can components. O-rings 380 may be used between the top portion 210 and middle portion 220 of can 200, and between the middle portion 220 and bottom portion 230 of can 200, as well as between the various other threadingly engaged components as necessary, to help provide a sealed engagement.

Figure 4:
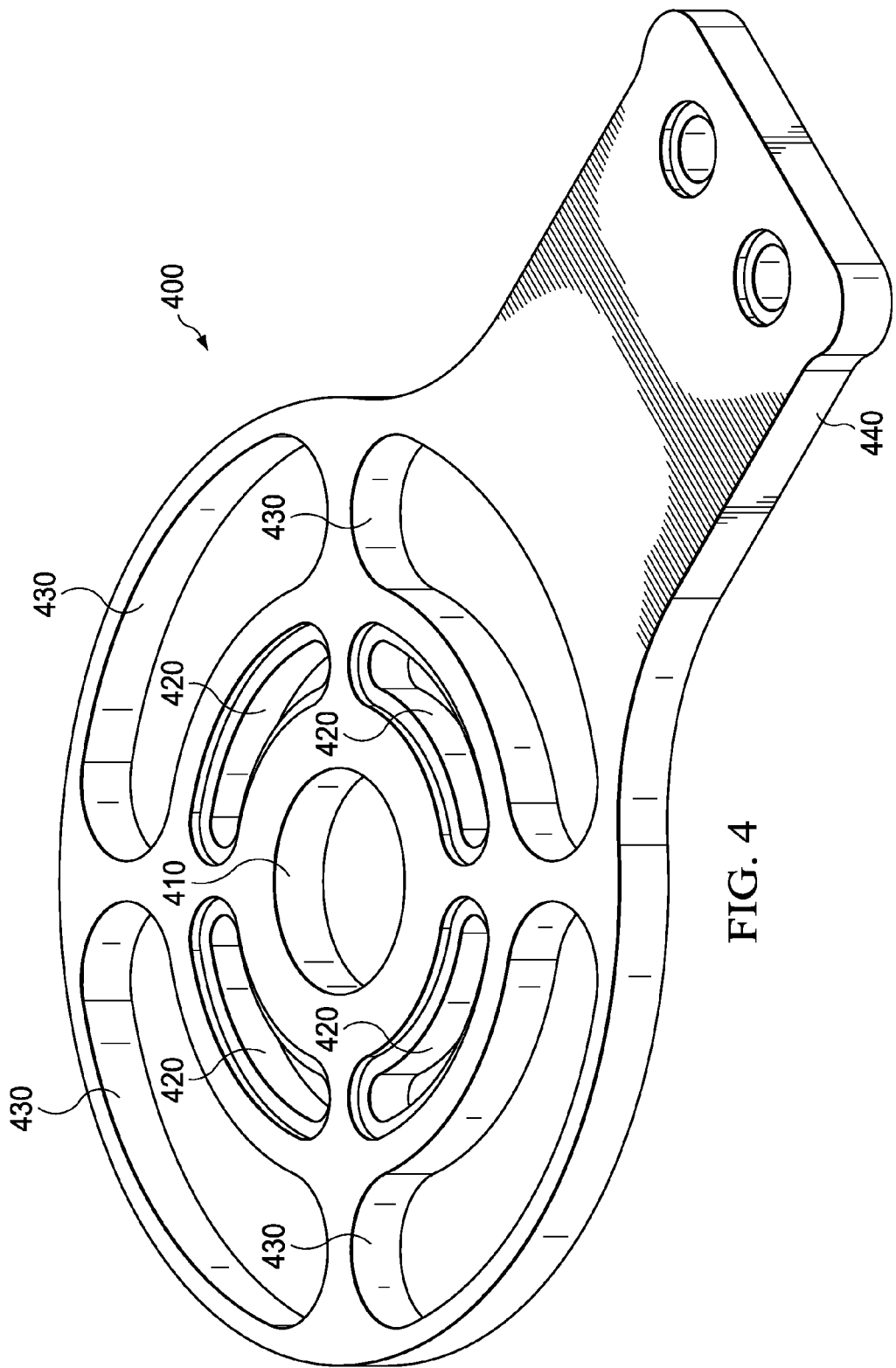
FIG. 4 is an exemplary embodiment of a mounting bracket for the oil and air separation can shown in FIG. 2.

FIGS. 3 and 4 show one exemplary embodiment of a mounting bracket 400 for can 200. The mounting bracket 400 includes a centrally disposed hole 410, which may be secured at intake port 290 of can 200 (e.g., with a nut, or by threaded engagement). The mounting bracket 400 includes an extension portion 440 for removably securing the bracket/can combination to an appropriate mount (e.g., with bolts). In can embodiments with upper mounting bolts operatively coupled to their top portions, the bolts 450 may be secured at grooves 420 (e.g., by a threaded engagement with top portion 210). Also, in can embodiments including one or more exhaust ports in their top portions, such ports may pass through and may be secured to the can at exhaust grooves 430. Although grooves 420, 430 may in an alternate embodiment be shaped as through holes, the configuration shown as grooves permits greater flexibility in use. That is, the can 200 may be rotated nearly three hundred sixty degrees to a particular desired mounting orientation.

Exemplary embodiments are described for scrubbing oil from blow-by gases. The volume of the can 200 may be adjusted by using different sized components for middle portion 220, or by adding various extension sections (each resembling middle portion 220) between middle portion 220 and bottom portion 230. It is believed that by increasing the volume of can 200, less oil may enter the exhaust side.

In accordance with the description herein, a method of oil and air separation may include providing an oil and air separation can including a diffuser tube positioned within a diffuser shield at a can intake for blow-by gases; and a first diffuser screen spaced vertically apart from a second diffuser screen proximate a can exhaust for blow-by gases, wherein the first diffuser screen and the second diffuser screen are spaced horizontally from the diffuser tube and extend about the diffuser shield.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. An oil and air separation can for an engine positive crankcase ventilation (PCV) system including: a diffuser tube positioned within a diffuser shield at a can intake for blow-by gases; and a first diffuser screen spaced vertically apart from a second diffuser screen proximate a can exhaust for blow-by gases, wherein the first diffuser screen and the second diffuser screen are spaced horizontally from the diffuser tube and extend about the diffuser shield.

2. The oil and air separation can of claim 1, wherein the diffuser tube includes a plurality of holes permitting fluid communication between the can intake and a lower interior portion of the diffuser shield.

3. The oil and air separation can of claim 2, wherein the diffuser tube includes a flange portion at a lower end of the diffuser tube.

4. The oil and air separation can of claim 3, wherein the flange portion extends from a diffuser tube sidewall to proximate an interior sidewall portion of the diffuser shield.

5. The oil and air separation can of claim 1, wherein one of the first diffuser screen and the second diffuser screen is perforated.

6. The oil and air separation can of claim 5, wherein the first diffuser screen is disposed below the second diffuser screen, and the second diffuser screen is perforated.

7. The oil and air separation can of claim 1, wherein the first diffuser screen and the second diffuser screen extend from an exterior sidewall of the diffuser shield to proximate an interior sidewall of the can.

8. The oil and air separation can of claim 1, further comprising a mounting bracket removably attached to the can proximate a blow-by gas intake.

9. A screen assembly adapted to fit an oil and air separation can for an engine positive crankcase ventilation (PCV) system including: (i) a diffuser tube disposed within a diffuser shield, and (ii) horizontally spaced from the diffuser tube, outside of the diffuser shield, a plurality of diffuser screens that are vertically spaced from one another.

10. The oil and air separation can of claim 9, wherein a first diffuser screen is spaced below a second diffuser screen.

11. The oil and air separation can of claim 10, wherein the second diffuser screen is perforated.

12. The oil and air separation can of claim 10, wherein the first diffuser screen and the second diffuser screen are each perforated.

13. A method of oil and air separation for an engine positive crankcase ventilation (PCV) system comprising: providing a can and a diffuser tube positioned within a diffuser shield at a can intake for blow-by gases; and a first diffuser screen spaced vertically apart from a second diffuser screen proximate a can exhaust for blow-by gases, wherein the first diffuser screen and the second diffuser screen are spaced horizontally from the diffuser tube and extend about the diffuser shield.

14. The method of claim 13, wherein the first diffuser screen and the second diffuser screen are each held in place relative to one another by o-rings.

15. The method of claim 13, wherein the diffuser tube partially defines an annular space between the diffuser tube and a portion of the diffuser shield.

16. The method of claim 15, further comprising a filter material disposed within the annular space.

17. The method of claim 16, wherein the filter material comprises stainless steel mesh.

18. The method of claim 13 including a flange disposed at a lower end of the diffuser shield.

19. The method of claim 18, wherein the flange has an outer diameter that is less than the inside diameter of the can.

* * * * *